United States Patent [19]

Osato et al.

[11] Patent Number: 4,816,840

[45] Date of Patent: Mar. 28, 1989

[54] OPTICAL RECORDING MEDIUM AND METHOD FOR PRODUCING THE SAME

[75] Inventors: Yoichi Osato, Yokohama; Ichiro Saito, Kawasaki; Yoshio Takasu, Tama, all of Japan

[73] Assignee: Canon Kabushiki Kaisha, Tokyo, Japan

[21] Appl. No.: 80,193

[22] Filed: Jul. 31, 1987

Related U.S. Application Data

[63] Continuation of Ser. No. 823,838, Jan. 31, 1986, abandoned, which is a continuation of Ser. No. 558,755, Dec. 6, 1983, abandoned.

[30] Foreign Application Priority Data

Dec. 8, 1982 [JP] Japan ............................ 57-215898

[51] Int. Cl.$^4$ .................................................. G01D 15/34
[52] U.S. Cl. ............................. 346/1.1; 346/76 L; 346/135.1; 430/945
[58] Field of Search ............... 346/76 L, 135.1, 1.1; 430/945; 369/285, 288

[56] References Cited

U.S. PATENT DOCUMENTS

| | | | |
|---|---|---|---|
| 3,959,799 | 5/1976 | Gambino | 346/135.1 |
| 4,188,214 | 2/1980 | Kido | 346/135.1 X |
| 4,214,249 | 7/1980 | Kasai et al. | 346/76 L |
| 4,237,468 | 12/1980 | Nahara | 346/135.1 X |
| 4,278,734 | 7/1981 | Ohta | 346/76 L X |
| 4,317,123 | 2/1982 | Namiki | 346/135.1 |
| 4,373,004 | 2/1983 | Asano | 346/76 L X |
| 4,458,004 | 7/1984 | Tanikawa | 346/135.1 X |
| 4,460,636 | 7/1984 | Watanabe | 346/76 L X |
| 4,463,083 | 7/1984 | Kitajima | 346/135.1 X |
| 4,499,178 | 2/1985 | Wada | 346/135.1 X |

Primary Examiner—Joseph W. Hartary
Attorney, Agent, or Firm—Fitzpatrick, Cella, Harper & Scinto

[57] ABSTRACT

An optical recording medium, having a substrate and a thin film containing a fluoride compound and a substance capable of undergoing an optical change through absorption of electromagnetic radiation (a film sensitive to electromagnetic radiation).

17 Claims, 5 Drawing Sheets

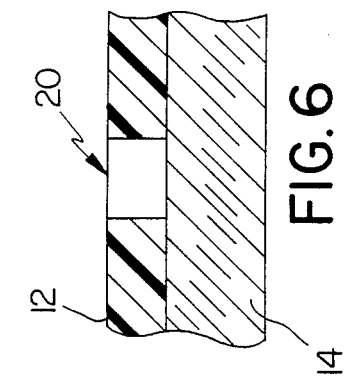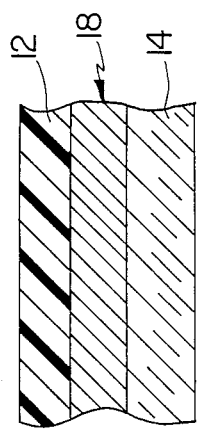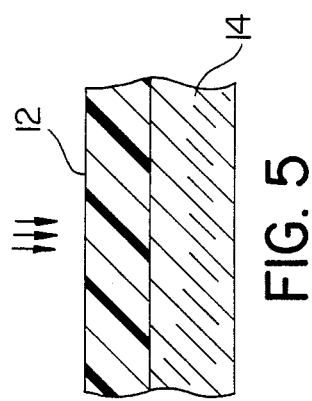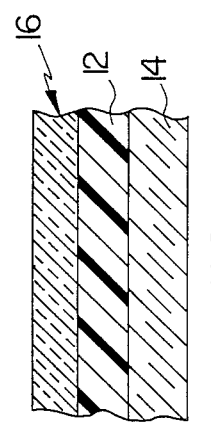

OPTICAL RECORDING MEDIUM AND METHOD FOR PRODUCING THE SAME

This application is a continuation of application Ser. No. 823,838 filed Jan 31, 1986, which is a continuation of Ser. No. 558,755, filed Dec. 6, 1983, both now abandoned.

BACKGROUND OF THE INVENTION

1. Field of the Invention

This invention relates to an optical recording medium for recording information by laser, relates etc. and reproducing the recorded information, more particularly to an optical recording medium which is capable of optical recording and reproduction at high density by a laser having wavelengths in the visible and near-infrared region and also low energy.

2. Description of the Prior Art

Generally speaking, an optical disc is capable of memorizing high density information with a number of optically detectable small pits (e.g., about $1\mu$) in the form of a helical or circular track, each pit being formed on a thin recording layer provided on a substrate. For writing information in such a disc, a focused laser beam is scanned on the surface of a laser-sensitive layer, and only the surface irradiated with the laser beam forms, as stated, pits, which are formed in the form of a helical or circular track. The laser-sensitive layer is capable of forming optically detectable pits by absorption of the laser energy. For example, according to a heat mode recording system, the laser-sensitive layer absorbs heat energy and forms small recess portions (pits) through vaporization or deformation at the sites where heat energy has been absorbed. Alternatively, according to another heat recording system, through absorption of the laser energy irradiated, there can be formed portions differing in oxidation degree, reflectance or optical density created by chemical changes at the irradiated portions, the difference being optically detectable.

The information recorded in the optical recording medium is detected by scanning a laser along the track and reading the optical changes at the portions where pits are formed and the portions where no pit is formed.

As the recording medium to be used for such recording-reproduction, there have heretofore been known metal thin films such as a vapor deposited film of aluminum, film composed principally of inorganic materials such as a bismuth thin film, tellurium oxide thin film or calcogenite type amorphous glass film, etc. or films of organic materials such as a plastic coated film containing a dye (pigment).

However, according to the methods of the prior art as described above wherein pits are formed by chemical changes, the sensitivity is insufficient and, moreover, the optical contrast between the pit-forming portions and the non-pit-forming portions is small, thus involving the disadvantage that the information recording does not have a high S/N ratio. Further, the recording medium having recorded information has the drawback of lacking stability in storage over a long term. On the other hand, according to the method wherein holes are formed, while high sensitivity and a high S/N ratio can be obtained, there is involved the drawback that the surface of the laser-sensitive layer exposed in the air may be oxidized in an environment having moisture or an oxidative atmosphere, to be deficient in stability. For overcoming such drawbacks, it has been proposed in the prior art to provide a protective layer on the upper and/or lower side of the laser-sensitive layer. Such a protective layer, however, will contrariwise lower sensitivity and S/N ratio.

SUMMARY OF THE INVENTION

An object of the present invention is to provide a novel optical recording medium which has improved relative to the shortcomings as described above.

Another object of the present invention is to provide an optical recording medium improved in sensitivity and in changes of optical characteristics which accompany with recording.

Still another object of the present invention is to provide an optical recording medium capable of maintaining records stably.

According to one aspect of the present invention, there is provided an optical recording medium, comprising a substrate and a thin film containing a fluoride compound and a substance capable of undergoing an optical change through absorption of electromagnetic radiation.

According to another aspect of the present invention, there is provided a method for preparing an optical recording medium, which comprises forming a layer sensitive to electromagnetic radiation comprising a substance which undergoes an optical change through absorption of electromagnetic radiation and a fluoride compound, by means of mixed vapor deposition or mixed sputtering.

BRIEF DESCRIPTION OF THE DRAWINGS

FIGS. 5 through 8 are cross-sectional views of several preferred embodiments of an optical recording medium according to the invention.

DETAILED DESCRIPTION OF THE PREFERRED EMBODIMENT

Figure 1:
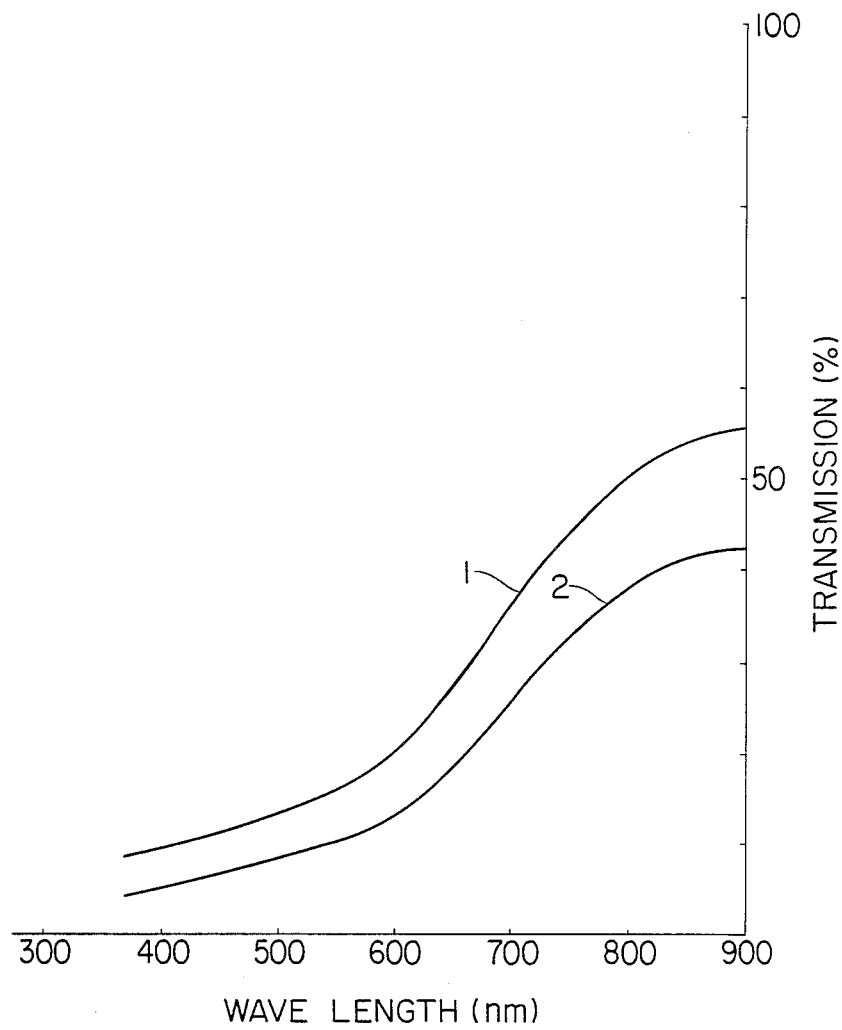
FIGS. 1 through 4 are schematic illustrations showing optical characteristic changes when the optical recording medium of the present invention receives heat action.

The optical recording medium of the present invention can be obtained by placing a substance, which can receive heat action by absorption of an electromagnetic radiation to undergo an optical change through such heat action, such as Te (tellurium), Pb (lead), Au (gold), Sn (tin), As (arsenic), Bi (bismuth), In (indium) or carbon black; and a fluoride compound including, for example, metal fluorides, such as $BiF_3$ (bismuth fluoride), $MgF_2$ (magnesium fluoride), $PbF_2$ (lead fluoride), LiF lithium (fluoride), CeF (cerium fluoride), AgF (silver fluoride), $CaF_2$ (calcium fluoride), $CrF_2$ (chromium difluoride) or $CrF_3$ (chromium trifluoride), or carbon fluoride such as polyfluorocarbon, in separate boats for vapor deposition, crucibles for vapor deposition or crucibles for electron beam vapor deposition, respectively, and effecting mixed vapor deposition or mixed sputtering on a substrate to form a film sensitive to electromagnetic radiation. It is also possible to form a film sensitive to electromagnetic radiation according to any of the known thin film forming systems such as the resistance heating system, the electron beam vapor deposition system or the sputtering system by use of a mixed pellet of the aforesaid fluoride compound and the metal. Among these systems, the vacuum vapor deposition method is one of the preferable systems for good reproducibility with simple operation, and it is desirable to perform vacuum vapor deposition under a degree of evacuation of $5 \times 10^{-5}$ Torr or lower. The rate of vapor deposition is 0.1 to 50 Å/sec., preferably 1 to 40 Å/sec.

The film sensitive to electromagnetic radiation of the present invention may contain the above-mentioned substance which undergoes optical changes through absorption of electromagnetic radiation in an amount preferably within the range from 20 to 70 mole %, and its film thickness may suitably be between 300 Å and 5000 Å.

The optical recording medium of the present invention, which can be obtained by forming the film 12 (see FIGS. 5 and 6) sensitive to electromagnetic radiation as mentioned above on a substrate 14 to be used as the support, can also have various auxiliary layers provided thereon. For example, for the purpose of controlling the thermal constant of the surface of the substrate, it is possible to use a substrate having a surface coated film comprising an inorganic or organic material. Also, there can be provided a protective layer 16 (see FIG. 7) comprising a transparent material on the sensitive to electromagnetic radiation and such a protective layer is effective for prevention of mechanical damage, and also effective for improvement of sensitivity, since it can be made to have an appropriate thickness so as to function as a film for prevention of relfection. It is also possible to provide a reflection layer 13 (see FIG. 8) between the layer sensitive 12 to electromagnetic radiation and the substrate 14. The reflection layer may be made of a vapor deposited layer or a laminated layer of reflective metal such as aluminum, silver or chromium.

In the optical recording medium of the present invention, there can also be formed what may be styled pre-grooves, having the function of track guiding groove or address designating groove as disclosed in Japanese Patent Application No. 72374/1982.

According to preferred embodiments of the invention, a coated film 12 containing at least one metal selected from the group of metals consisting of Te (tellurium), Pb (lead), Au (gold), Sn (tin) and As (arsenic) in a matrix comprising a bismuth fluoride BiFx$_1$ ($0 < x_1 \leq 3$) or a lead fluoride PbFx$_2$ ($0 < x_2 \leq 2$) may be used as the film sensitive to electromagnetic radiation. The metals may be contained in the matrix of bismuth fluoride or lead fluoride preferably in an amount of 20 to 70 mole %, and portions 20 (see FIG. 6) can be formed on the coated film by irradiation of, for example, a gallium-arsenic-aluminum semiconductor laser (oscillated wavelength: 820 nm), argon gas laser (oscillated wavelengths: 488 nm, 515 nm), helium-neon gas laser (oscillated wavelengths: 632.8 nm) or other lasers having oscillated wavelengths from the visible region to the infrared region, various short pulse emission lamps such as a xenon flash lamp or an infrared lamp light, or contact with a heater. Certain portions have a reflectance different from that other portions. Accordingly, for example, portions can be formed by scanning electromagnetic radiation along the track, and a low output laser can be scanned along said track having certain portions and other portions and the difference in reflectance therebetween is read by means of a photodetector.

For constitution of the optical recording medium of the present invention, the substrate to be used as the support may preferably be transparent, when recording is effected by permitting the light for information recording (electromagnetic radiation) to enter from the substrate side. As the light source for recording information on the recording medium, there may be employed a semiconductor laser, argon gas laser, helium-neon gas laser or otherwise lasers having oscillated wavelengths from visible region to infrared region, and also various short pulse emission lamps such as a xenon flash lamp, as described above. Therefore, as the transparent substrate, it is preferred for improvement of sensitivity to use a material having a transparency suitable for the optical wave characteristics of the desired light source. In this context, a transmittance of about 90% or more of the incident light may be mentioned as a measure of transparency.

As the transparent substrate having sufficient transmittance relative to any of the light sources as mentioned above, there may be employed films or sheets comprising inorganic materials such as glass, polymers such as polyester, polypropylene, polycarbonate, polyvinyl chloride, polyamide, polystyrene, polymethyl methacrylate, modified polymers of these, copolymers, blend polymers and others. In the case when the surface smoothness of the substrate itself has a great influence on the S/N ratio of signals as in a video disc, it is preferred to use a substrate which is prepared by coating a separate substrate uniformly with the aforesaid polymers according to spinner coating, etc. As the transparent substrate, which can particularly preferably be employed, films or sheets of polyester or polymethyl methacrylate may be included.

On the other hand, when recording is effected by permitting the information recording light from the side opposite to the substrate, other than the transparent substrates as mentioned above, it is also possible to use films of sheets having coloring matters (dyes), pigments or reinforcing agents added to inorganic materials or polymers, or metallic plates such as of aluminum alloys as the substrate.

The present invention has the following effects, as compared with a recording medium to be used in the system wherein holes are formed on the recording surface by irradiation of laser beam or a recording medium to be used in the system where pits changed in optical characteristics such as reflectance or transmittance are formed on the recording surface.

(1) It has high sensitivity, with the laser-sensitive thin film having great absorption efficiency relative to the recording laser beam, and recording can be effected by a helium-neon gas laser beam or a semiconductor laser beam with an energy density of 50 mJ/cm$^2$ or less.

(2) It has high reproduction efficiency. In reproducing the information recorded by helium-neon gas or a semiconductor laser beam, the initial difference ΔT in transmittance between the unrecorded portions and the recorded portions can be made 25% or more, and the difference in reflectance ΔR 15% or more.

The present invention is illustrated in detail by referring to the following Examples, in which the "filling percentage" means the volume percentage of the metal added in the layer sensitive to electromagnetic radiation.

EXAMPLE 1

A disc substrate of polymethyl methacrylate with a diameter of 30 cm having good surface smoothness prepared according to the casting method was set in a vacuum vapor deposition tank. The disc is mounted so as to be rotatable near the middle portion of the device. The device is equipped internally with three boats for heating vapor deposition and an electron beam vapor deposition device having five crucibles with the central axis for rotation as their centers. In two of the boats were placed bismuth fluoride (BiF$_3$) and the Te (tellurium), respectively. After the tank was evacuated to $2 \times 10^{-5}$ Torr, the rotational speed of the substrate was made 50 rpm, followed by vapor deposition to form a coated film with a thickness of 1000 Å so that the filling percentages of bismuth fluoride and tellurium may each become 50%. The rate of vacuum deposition during this operation was 1 Å/sec.

The recording medium thus prepared was mounted on a turntable and, while rotating the turn table at a rotational speed of 1000 rpm, recording was performed by scanning a gallium-arsenic-aluminum semiconductor laser (oscillated wavelength: 820 nm) with a light source output of 15 mW focused to a spot size of 1.0μ through an optical lens and modulated to a pulse width of 4 MHz in shape of a track on the bismuth fluoride-tellurium layer.

When the surface of the recorded recording medium was observed by an optical microscope, the ellipsoid-shaped portions with shorter diameter of about 1μ could be judged to be brighter, namely higher in reflectance, as compared with the other portions.

Also, when the same recording medium as described above was heated under vacuum at a temperature of 200° C. for 20 minutes and the changes in transmittance were measured, it was found that the optical changes as clarified in FIG. 1 had occurred. In the FIG. 1 shows the transmittance (%) before heating, and 2 the transmittance (%) after heating.

Further, for measurement of enduring stability with lapse of time, the above recorded recording medium was left to stand under a compulsory environment of a temperature of 35° C. and a relative humidity of 90% for 96 hours and the surface of the recorded recording medium was observed by a scanning microscope similarly as described above. As the result, portions having high reflectance similar to those as observed before durability test were recognized. When a low output gallium-arsenic-aluminum semiconductor laser was permitted to enter the recording medium which had been recorded and subjected to the durability test, and the reflected light was detected, there could be obtained a wave pattern having a sufficiently high S/N ratio.

EXAMPLE 2

An optical recording medium was prepared according to the procedure as in Example 1, except for using In (indium) in place of Te (tellurium) employed in preparation of the optical recording medium as described in Example 1.

Figure 2:
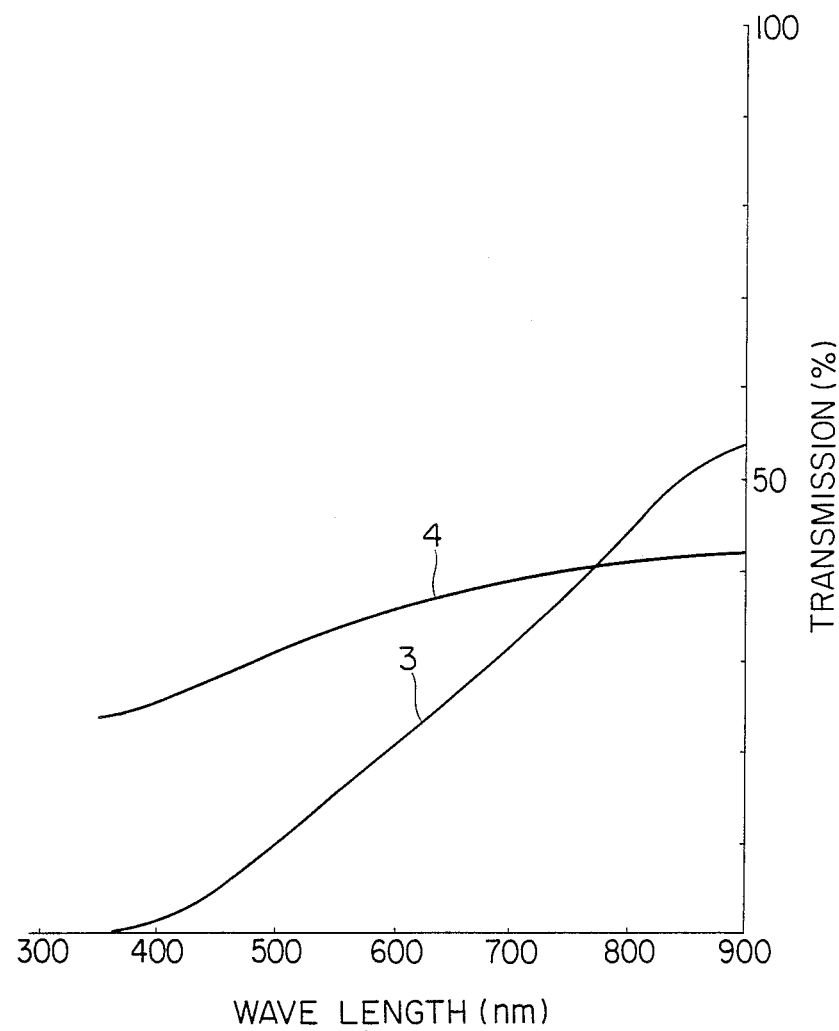

The changes in transmittance of the recording medium thus prepared when heated under vacuum at 200° C. for 20 minutes were measured. The result is shown in FIG. 2, in which 3 is the transmittance (%) before heating, and 4 the transmittance (%) after heating.

When the laser was scanned over the recording medium prepared in this Example in the same manner as in Example 1 and its surface was observed, portions having high reflectance were recognized. Further, enduring stability and S/N ratio were measured similarly as in Example 1 to obtain satisfactory results with respect to both of enduring stability and S/N ratio.

EXAMPLE 3

An optical recording medium was prepared according to the procedure as in Example 1, except for using Sn (tin) in place of Te (tellurium) employed in preparation of the optical recording medium as described in Example 1.

Figure 3:
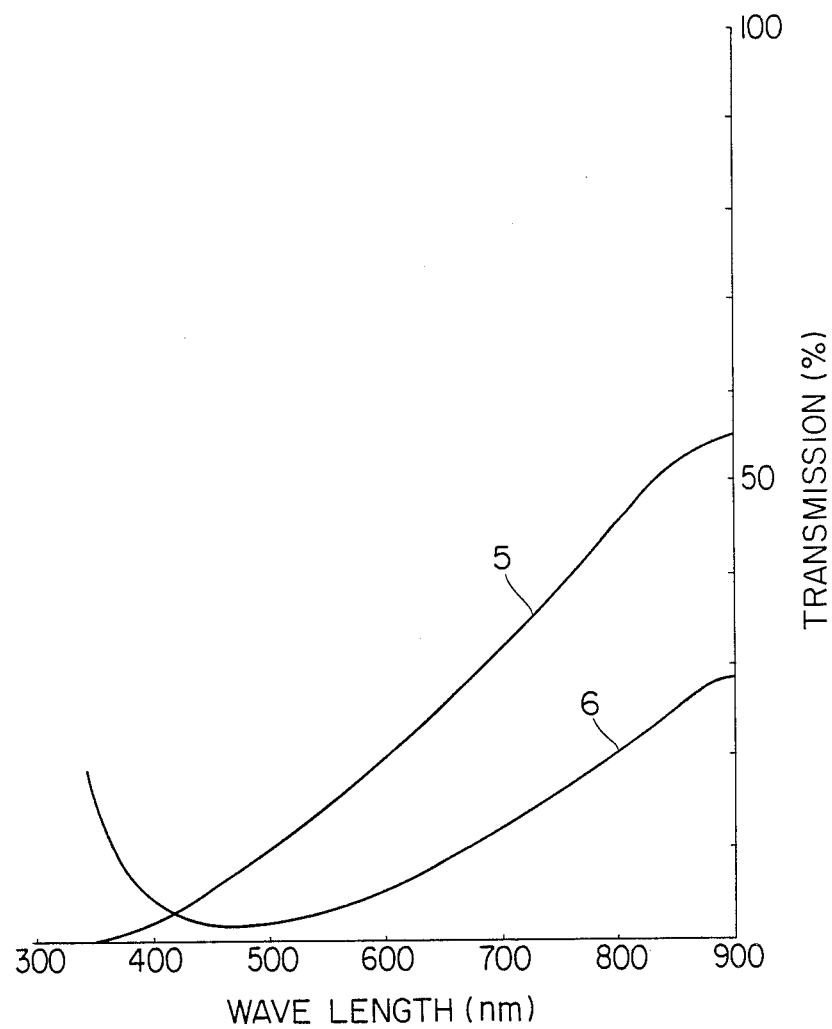

The changes in transmittance of the recording medium thus prepared when heated under vacuum at 200° C. for 20 minutes were measured. The result is shown in FIG. 3, in which 5 is the transmittance (%) before heating, and 6 the transmittance (%) after heating.

When the laser was scanned over the recording medium prepared in this Example in the same manner as in Example 1 and its surface was observed, pits having high reflectance were recognized. Further, enduring stability and S/N ratio were measured similarly as in Example 1 to obtain satisfactory results with respect to both of enduring stability and S/N ratio.

EXAMPLE 4

An optical recording medium was prepared according to the procedure as in Example 1, except for using Au (gold) in place of Te (tellurium) employed in preparation of the optical recording medium as described in Example 1.

Figure 4:
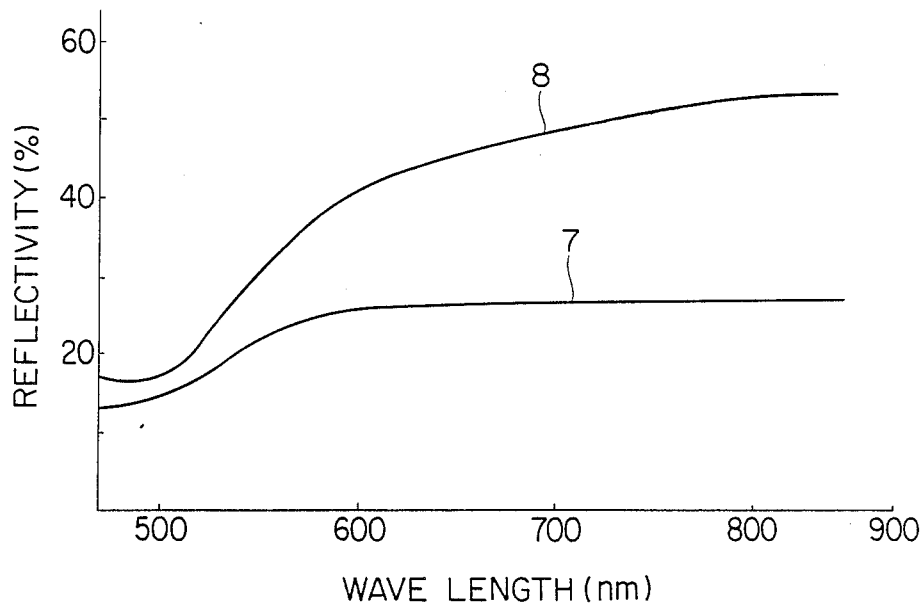

The changes in reflectance of the recording medium thus prepared when heated under vacuum at 300° C. for 15 minutes were measured. The result is shown in FIG. 4, in which 7 is the reflectance (%) before heating, and 8 the reflectance (%) after heating.

When the laser was scanned over the recording medium prepared in this Example in the same manner as in Example 1 and its surface was observed, portions having high reflectance were recognized. Further, enduring stability and S/N ratio were measured similarly as in Example 1 to obtain satisfactory results with respect to both of enduring stability and S/N ratio.

EXAMPLE 5

An optical recording medium was prepared according to the procedure as in Example 1, except for using PbF$_2$ (lead fluoride) in place of the BiF$_3$ (bismuth fluoride) employed in preparation of the optical recording medium as described in Example 1.

When the laser was scanned over the recording medium prepared in this Example in the same manner as in Example 1 and its surface was observed, portions having high reflectance were recognized. Further, enduring stability and S/N ratio were measured similarly as in Example 1 to obtain satisfactory results with respect to both enduring stability and S/N ratio.

What we claim is:

1. A method for preparing a laser beam-readable optical recording medium comprising:
   providing a medium including a substrate having thereon a thin film containing a fluoride compound and a substance capable of undergoing a change in reflectivity through the absorption of electromagnetic radiation; and
   irradiating said medium with an electromagnetic radiation beam to form on said thin film first portions having higher reflectivity than second portions of said medium surrounding said first portions, but not causing a portion of said film to become lower than its surroundings or creating a portion of said film wherein there is an opening extending through said film, wherein
   in said first portions having higher reflectivity the fraction of total radiant flux incident thereupon which is reflected is greater than the fraction of total radiant flux incident upon said second portions medium which is reflected.

2. The method according to claim 1, wherein said fluoride compound is at least one compound selected from the group consisting of $BiF_3$, $MgF_2$, $PbF_2$, $LiF$, $CeF_3$, $AgF$, $CaF_2$, $CrF_2$, $CrF_3$ and carbon fluoride.

3. The method according to claim 1, wherein said fluoride compound is $BiF_{x_1}$ ($0 < x_1 \leq 3$).

4. The method according to claim 1, wherein said fluoride compound is $PbF_{x_2}$ ($0 < x_2 \leq 2$).

5. The method according to claim 1, wherein the substance capable of undergoing a change in reflectivity through absorption of electromagnetic radiation is a substance which undergoes an optical change by thermal action.

6. The method according to claim 5, wherein the substance capable of undergoing change in reflectivity through absorption of electromagnetic radiation is at least one substance selected from the group consisting of Te, Pb, Au, Sn, As, Bi, In and carbon.

7. The method according to claim 1, wherein said thin film has a thickness of 300 Å to 5000 Å.

8. The method according to claim 1, wherein a protective layer is provided on said thin film.

9. The method according to claim 1, wherein a reflection preventive film is provided on said thin film.

10. The method according to claim 1, wherein a reflection layer is provided between said substrate and said thin film.

11. The method according to claim 10, wherein said reflection layer is a vapor deposited layer or a laminated layer of aluminum, silver or chromium.

12. The method according to claim 1, wherein said substrate is a transparent material having a transmittance of 90% or higher.

13. The method according to claim 12, wherein the transparent material is glass, polyester, polypropylene, polycarbonate, polyvinyl chloride, polyamide, polystyrene or polymethyl methacrylate.

14. The method according to claim 1, wherein said substrate is a metal plate.

15. The method according to claim 1, wherein said electromagnetic radiation is a semiconductor laser, argon gas laser or helium-neon gas laser.

16. The method according to claim 1, wherein said thin film is a coated film comprising a substance capable of undergoing a change in reflectivity through absorption of electromagnetic radiation contained in a matrix of a fluoride compound.

17. The method according to claim 1, wherein the substance capable of undergoing a change in reflectivity through absorption of electromagnetic radiation is contained in an amount ranging from 20 to 70 mole %.

* * * * *

UNITED STATES PATENT AND TRADEMARK OFFICE
CERTIFICATE OF CORRECTION

PATENT NO. : 4,816,840
DATED : March 28, 1989
INVENTOR(S) : YOICHI OSATO ET AL.  Page 1 of 2

It is certified that error appears in the above-identified patent and that said Letters Patent is hereby corrected as shown below:

COLUMN 1

Line 13, "relates" should be deleted.
    Line 14, "information, more" should read --information, and relates more--.
    Line 27, "forms, as" should read --forms--.
    Line 28, "stated, pits, which are formed in" should read --pits, which are formed, as stated, in--.

COLUMN 2

Line 6, "S/N ratio." should read --the S/N ratio.--.
    Line 52, "lithium (fluoride)," should read --(lithium fluoride),--.

COLUMN 3

Line 21, "the sensitive" should read --the film 12 sensitive--.
    Line 27, "reflection layer 13" should read --reflection layer 18--.
    Line 51, "(oscillated wavelengths: 632.8nm)" should read --(oscillated wavelength: 632.8nm)--.
    Line 56, "that other" should read --that of other--.

COLUMN 5

Line 12, "turn table" should read --turntable--.

COLUMN 6

Line 11, "pits" should read --portions--.

UNITED STATES PATENT AND TRADEMARK OFFICE
CERTIFICATE OF CORRECTION

PATENT NO. : 4,816,840

DATED : March 28, 1989

INVENTOR(S) : YOICHI OSATO ET AL.

Page 2 of 2

It is certified that error appears in the above-identified patent and that said Letters Patent is hereby corrected as shown below:

COLUMN 7

Line 2, "medium" should be deleted.

Signed and Sealed this

Thirteenth Day of February, 1990

Attest:

JEFFREY M. SAMUELS

Attesting Officer

Acting Commissioner of Patents and Trademarks